United States Patent
Lei et al.

(10) Patent No.: US 12,516,689 B2
(45) Date of Patent: Jan. 6, 2026

(54) CLAMP AND RAIL QUICK MOUNTING SYSTEM

(71) Applicants: Chon Weng Lei, Macau (CN); Pou Ut Chan, Macau (CN); Pou Hei Chan, West Lafayette, IN (US); Wai Teng Sin, Macau (CN)

(72) Inventors: Chon Weng Lei, Macau (CN); Pou Ut Chan, Macau (CN); Pou Hei Chan, West Lafayette, IN (US); Wai Teng Sin, Macau (CN)

( * ) Notice: Subject to any disclaimer, the term of this patent is extended or adjusted under 35 U.S.C. 154(b) by 433 days.

(21) Appl. No.: 18/082,084

(22) Filed: Dec. 15, 2022

(65) Prior Publication Data
US 2024/0052860 A1    Feb. 15, 2024

Related U.S. Application Data

(60) Provisional application No. 63/396,379, filed on Aug. 9, 2022.

(51) Int. Cl.
*F16B 2/12* (2006.01)
*F16B 5/06* (2006.01)

(52) U.S. Cl.
CPC .............. *F16B 2/12* (2013.01); *F16B 5/0614* (2013.01); *Y10T 403/7067* (2015.01)

(58) Field of Classification Search
CPC ........ F16B 2/06; F16B 2/12; F16B 2200/403; F16B 5/0614; Y10T 403/7067
See application file for complete search history.

(56) References Cited

U.S. PATENT DOCUMENTS

| | | | | |
|---|---|---|---|---|
| 2,962,133 A * | 11/1960 | Kivett | ................... | F16B 5/0072 52/471 |
| 4,497,148 A * | 2/1985 | Lopez | ................... | E04B 2/7448 52/239 |
| 5,123,770 A * | 6/1992 | Trenner | .................... | F16B 2/12 403/312 |
| 6,991,399 B2 * | 1/2006 | Park | ......................... | F16B 2/14 403/374.1 |
| 9,353,505 B2 * | 5/2016 | Pilon | ..................... | E02F 9/2883 |

FOREIGN PATENT DOCUMENTS

GB  15449  *  3/1912  ............ F16B 5/0614

* cited by examiner

*Primary Examiner* — Michael P Ferguson
(74) *Attorney, Agent, or Firm* — Barry Choobin; Patent 360

(57) ABSTRACT

A quick mounting assembly for quickly mounting and dismounting a payload to an object, such as a robotic vehicle. The quick mounting assembly includes a clamp and a rail. The clamp includes a base plate, an upper jaw, a lower jaw, and a wedge. The wedge can be sandwiched between the upper jaw and the lower jaw, wherein the upper jaw and the lower jaw interlock with the base plate. A fastener passing through the upper jaw, the lower jaw, and the wedge can secure the upper jaw and the lower jaw to the base plate. The upper jaw and the lower jaw can clamp the rail. The clamp can be coupled to the payload and the rail can be coupled to the object for quickly mounting the payload to the object.

12 Claims, 14 Drawing Sheets

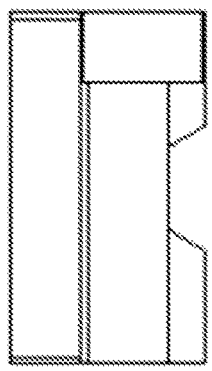
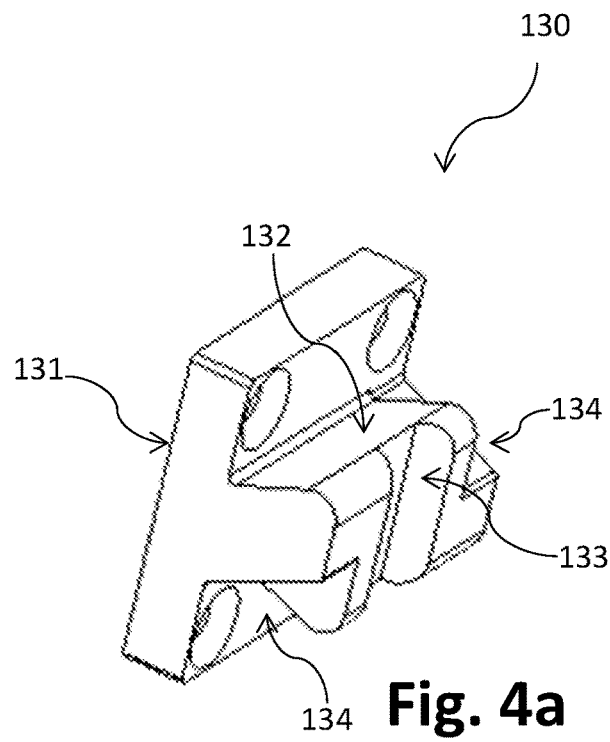
Fig. 4b
Fig. 4a
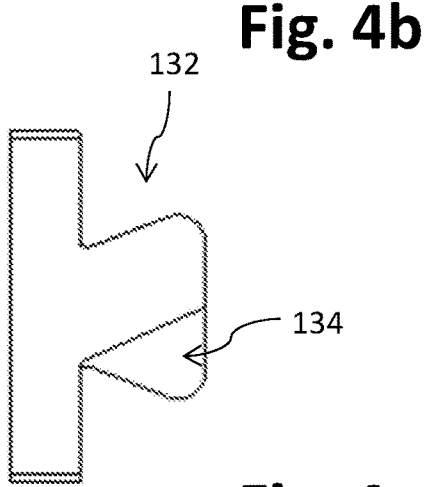
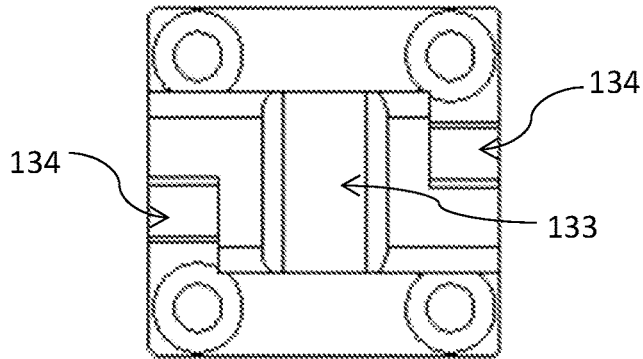
Fig. 4c
Fig. 4d
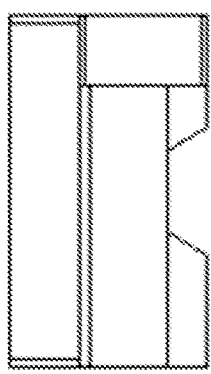
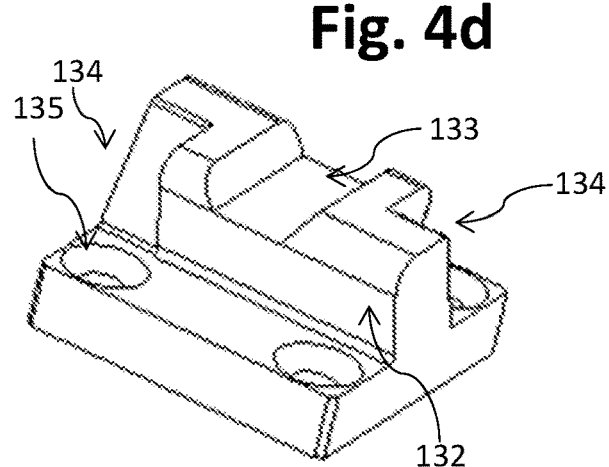
Fig. 4e
Fig. 4f

CLAMP AND RAIL QUICK MOUNTING SYSTEM

CROSS-REFERENCE TO RELATED APPLICATIONS

This application claims priority from a U.S. Provisional Patent Appl. No. 63/396,379 filed on Aug. 9, 2022, which is incorporated herein by reference in its entirety.

FIELD OF INVENTION

The present invention relates to a quick-mounting system for implements and tools, and more particularly, the present invention relates to a quick-mounting tool having a clamp and rail system for quick mounting and unmounting implements and tools.

BACKGROUND

Quick mounting assemblies are often used to mount accessories, implements, tools, and the like to any other article or object. Quick mounting assemblies differ from normal fasteners in terms of the time required to mount and unmount an accessory. Quick mounting assemblies are used when lesser efforts and lesser time are a necessity.

A need is always appreciated for improvements in quick mounting assemblies that take lesser time and/or lesser effort.

SUMMARY OF THE INVENTION

The following presents a simplified summary of one or more embodiments of the present invention to provide a basic understanding of such embodiments. This summary is not an extensive overview of all contemplated embodiments and is intended to neither identify critical elements of all embodiments nor delineate the scope of any or all embodiments. Its sole purpose is to present some concepts of one or more embodiments in a simplified form as a prelude to the more detailed description that is presented later.

The principal object of the present invention is therefore directed to a quick mounting assembly that can be mounted and unmounted very quickly.

It is another object of the present invention that the assembly has good mechanical strength.

It is still another object of the present invention that the assembly can be easily adapted for different payloads.

It is yet another object of the present invention that the assembly is versatile in use.

In one aspect, disclosed is a quick mounting assembly and a method for quickly mounting and unmounting a payload to an object. The quick mounting assembly comprises a clamp and a rail. The clamp comprises a base plate; an upper jaw; a lower jaw; and a wedge. The rail has a proximal end and a distal end, a top of the rail has an upper groove near the proximal end of the rail and extends transversely, a bottom of the rail has a lower groove near the proximal end of the rail and extends transversely. The traversing grooves have chamfered edges. The base plate comprises a base, the base has a front face and a rear face; and a dovetail protrusion disposed on the front face of the base, the dovetail protrusion, relative to the front face of the base, forms an upper valley and a lower valley, wherein each of the upper jaw and the lower jaw has tooths, the tooth of the upper jaw is configured to engage with the upper groove in the rail and the tooth of the lower jaw is configured to engage with the lower groove in the rail for securing the clamp to the rail, wherein each of the upper jaw and the lower jaw has an end-sloped protrusion configured to slidably fit into the upper valley and the lower valley respectively for interlocking the upper jaw and the lower jaw to the base plate.

In one implementation, each of the upper jaw and the lower jaw has concentric apertures through which the fastener can pass through for securing the upper jaw and the lower jaw to the base plate, wherein tightening of the fastener bring the upper jaw and the lower jaw closer towards each other, wherein tightening of the fastener secures the clamp to the rail.

In one implementation, the dovetail protrusion has a traversing channel passing through a middle thereof.

In one implementation, the wedge is of an elongated triangular profile, the wedge has an elongated hole, the wedge is sandwiched between the upper jaw and the lower jaw, wherein the fastener passes through the elongated hole in the wedge. The wedge has a flat front face and a narrow rear end, wherein the narrow rear end faces the base plate, the elongated hole in the wedge permits the wedge to move towards and away from the base plate, wherein each of the upper jaw and the lower jaw has a mid-sloped protrusion, the mid-sloped protrusion has a flat and sloped surface, wherein the mid-sloped protrusion of the upper jaw juxtaposes with an upper surface of the wedge, the mid-sloped protrusion of the lower jaw juxtaposes with a lower surface of the wedge, wherein bringing the upper jaw and the lower jaw closer by tightening the fastener pushes the wedge away from the base plate. The flat front face of the wedge is configured to juxtapose with the proximal end of the rail. The mid-sloped protrusions of each of the upper jaw and the lower jaw has trapezoidal protrusions, the wedge has a protrusion on its narrow rear end, the trapezoidal protrusions of the upper jaw and the lower jaw and the protrusion of the wedge are configured to slidably fit into the traversing channel.

BRIEF DESCRIPTION OF THE DRAWINGS

The accompanying figures, which are incorporated herein, form part of the specification and illustrate embodiments of the present invention. Together with the description, the figures further explain the principles of the present invention and enable a person skilled in the relevant arts to make and use the invention.

FIG. 4a is a top and side perspective view of a base plate of the clamp, according to an exemplary embodiment of the present invention.

FIG. 4b is a top perspective view of the base plate of the clamp, according to an exemplary embodiment of the present invention.

FIG. 4c is a side view of the base plate of the clamp, according to an exemplary embodiment of the present invention.

FIG. 4d is a front view of the base plate of the clamp, according to an exemplary embodiment of the present invention.

FIG. 4e is a bottom view of the base plate of the clamp, according to an exemplary embodiment of the present invention.

FIG. 4f is another perspective view of the base plate of the clamp, according to an exemplary embodiment of the present invention.

DETAILED DESCRIPTION

Figure 1:
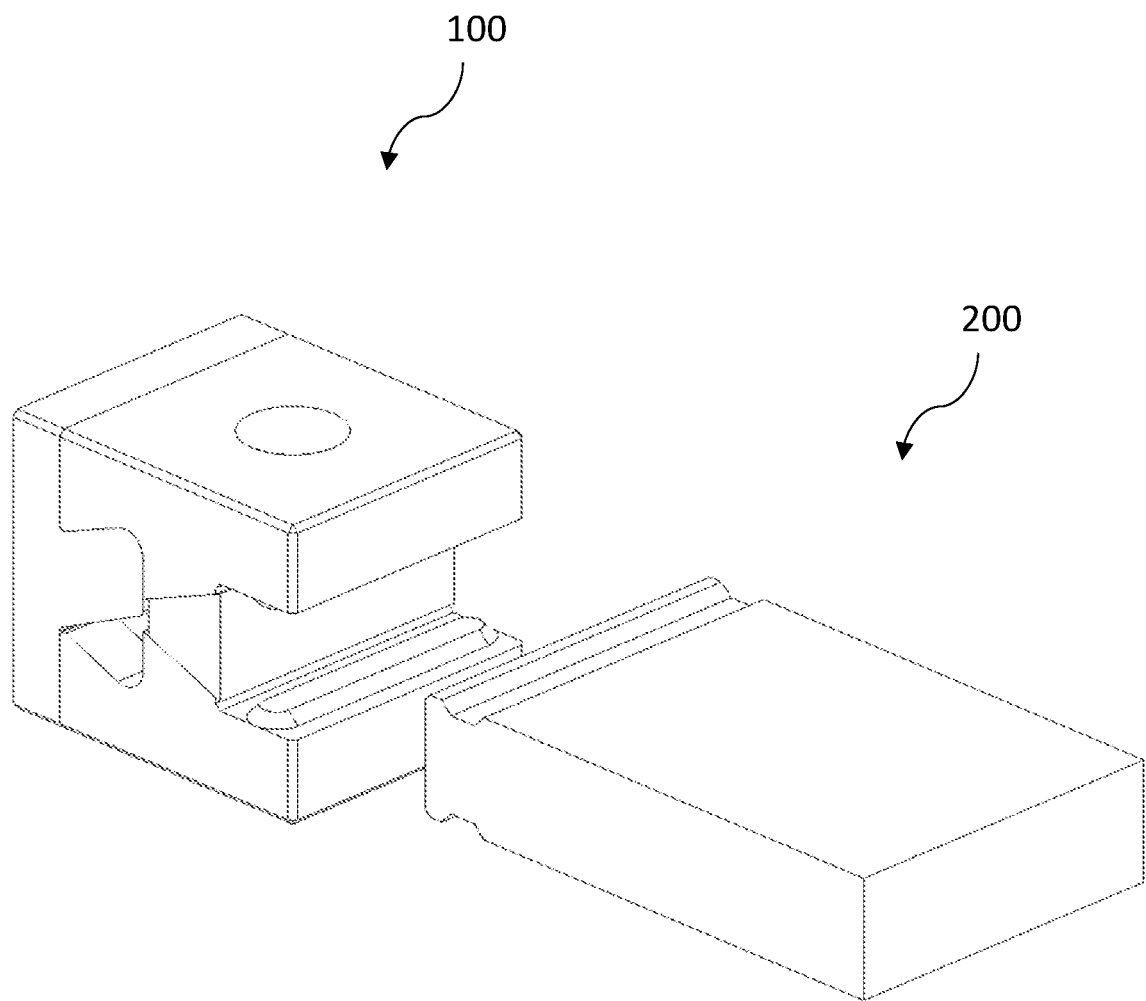
FIG. 1 is a perspective view of a quick mounting assembly, according to an exemplary embodiment of the present invention.

Subject matter will now be described more fully hereinafter. Subject matter may, however, be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, the subject matter may be embodied as apparatus and methods of use thereof. The following detailed description is, therefore, not intended to be taken in a limiting sense.

The word "exemplary" is used herein to mean "serving as an example, instance, or illustration." Any embodiment described herein as "exemplary" is not necessarily to be construed as preferred or advantageous over other embodiments. Likewise, the term "embodiments of the present invention" does not require that all embodiments of the invention include the discussed feature, advantage, or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

The following detailed description includes the best currently contemplated mode or modes of carrying out exemplary embodiments of the invention. The description is not to be taken in a limiting sense but is made merely for the purpose of illustrating the general principles of the invention since the scope of the invention will be best defined by the allowed claims of any resulting patent.

The following detailed description is described with reference to the drawings, wherein like reference numerals are used to refer to like elements throughout. In the following description, for purposes of explanation, specific details may be set forth in order to provide a thorough understanding of the subject innovation. It may be evident, however, that the claimed subject matter may be practiced without these specific details. In other instances, well-known structures and apparatus are shown in block diagram form in order to facilitate describing the subject innovation. Moreover, the drawings may not be to scale.

REFERENCE NUMERALS

- 100: Clamp
- 110: upper jaw
- 120: lower jaw
- 130: Base plate
- 140: wedge
- 150: screw
- 160: nut
- 200: Rail
- 210: groove
- 220: chamfered edges
- 131: base
- 132: dovetail protrusion
- 133: traversing channel
- 134: cut-outs
- 135: Apertures
- 121: tooth
- 122: chamfered edges
- 123: end-sloped protrusion
- 124: mid-sloped protrusion
- 125: a trapezoidal protrusion
- 126: Square cutout and aperture
- 111: Screw head counterbore and aperture
- 141: aperture
- 142: trapezoidal protrusion
- 143: front face
- 300: clamp
- 310: lower jaw
- 311: tooth
- 312: end-sloped protrusion
- 313: side protrusion
- 314: mid-flat protrusion
- 315: Screw head counterbore and aperture
- 320: upper jaw
- 330: base plate
- 340: fastener
- 350: nut
- 400: Clamp
- 410: upper jaw
- 420: lower jaw
- 430: base plate
- 440: wedge
- 450: fastener
- 460: nut
- 500: Clamp
- 510: upper jaw
- 520: lower jaw
- 530: base plate
- 540: fastener
- 550: nut Disclosed is a quick mounting assembly that can be used to quickly mount and unmount implements, tools, and the like payload. The disclosed assembly in particular can be adapted for loading and unloading payload on robotic vehicles, remotely operated underwater vehicles (ROV), and the like. The disclosed quick mounting assembly can include a clamp and a rail, wherein the clamp and the rail can be quickly engaged and disengaged.

Figure 2:
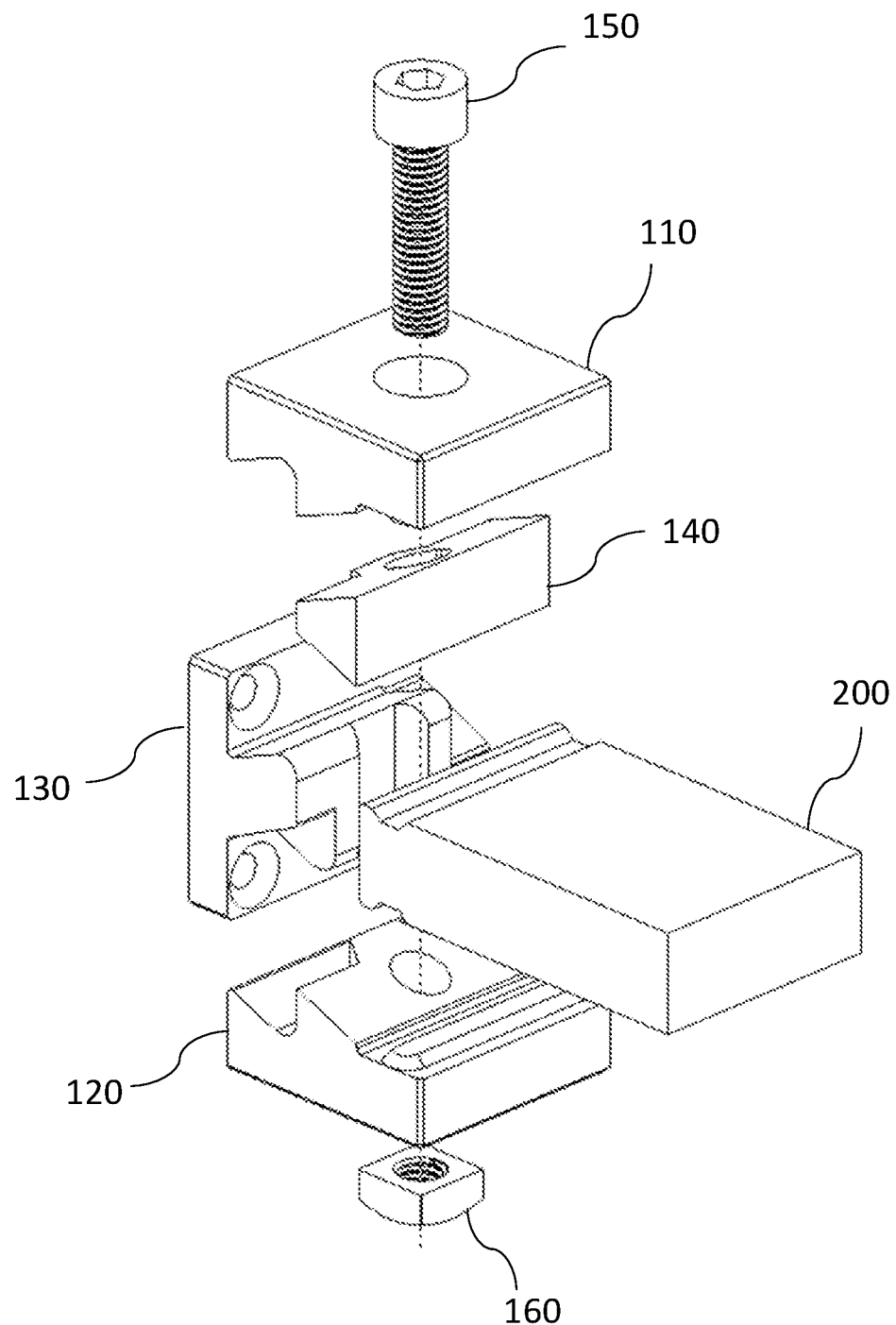
FIG. 2 is an exploded view of the quick mounting assembly, according to an exemplary embodiment of the present invention.
Figure 3A:
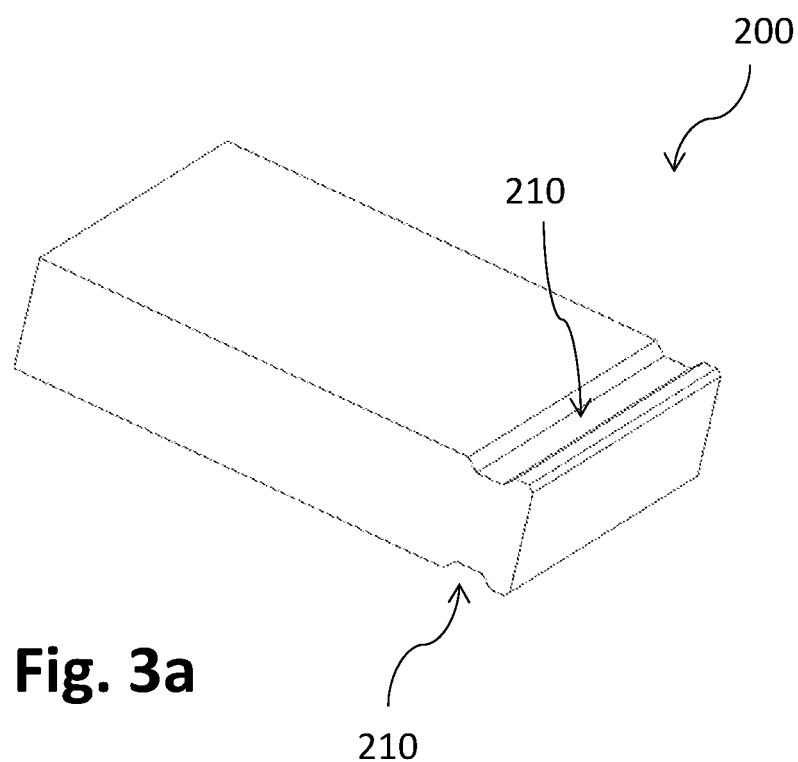
FIG. 3a is a perspective view of the rail, according to an exemplary embodiment of the present invention.
Figure 3B:
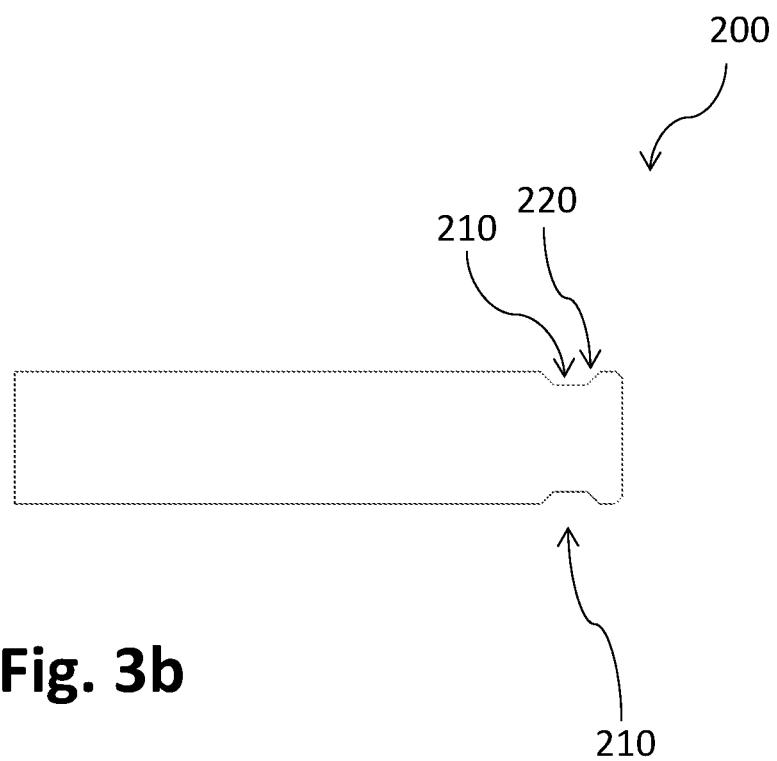
FIG. 3b is a side view of the rail, according to an exemplary embodiment of the present invention.
Figure 5A:
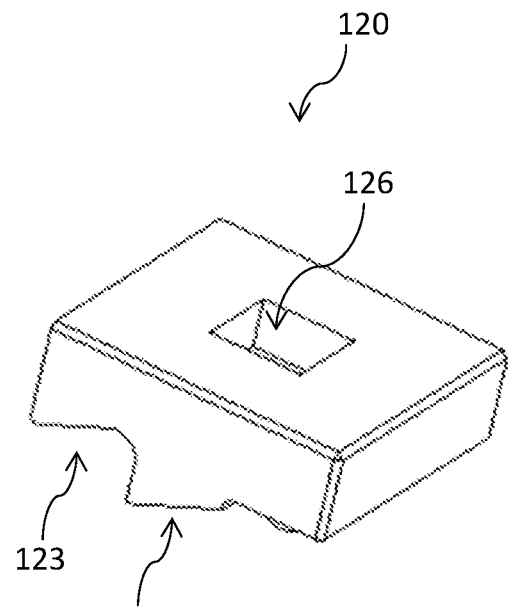
FIG. 5a is a bottom and side perspective view of the lower jaw of the clamp, according to an exemplary embodiment of the present invention.
Figure 5B:
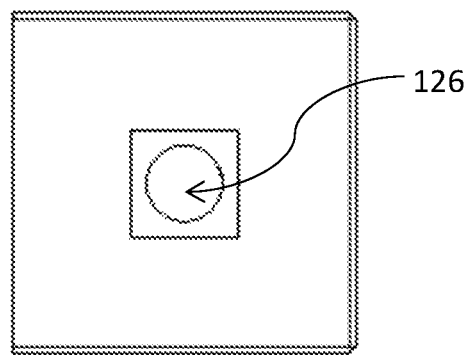
FIG. 5b is a bottom view of the lower jaw of the clamp, according to an exemplary embodiment of the present invention.
Figure 5C:
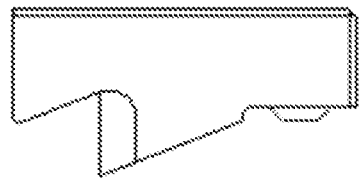
FIG. 5c is a side view of the lower jaw of the clamp, according to an exemplary embodiment of the present invention.
Figure 5D:
FIG. 5d is a front view of the lower jaw of the clamp, according to an exemplary embodiment of the present invention.
Figure 5E:
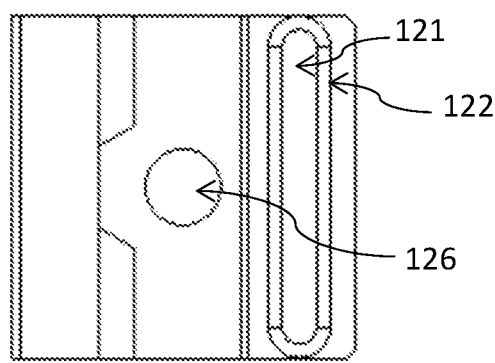
FIG. 5e is a top view of the lower jaw of the clamp, according to an exemplary embodiment of the present invention.
Figure 5F:
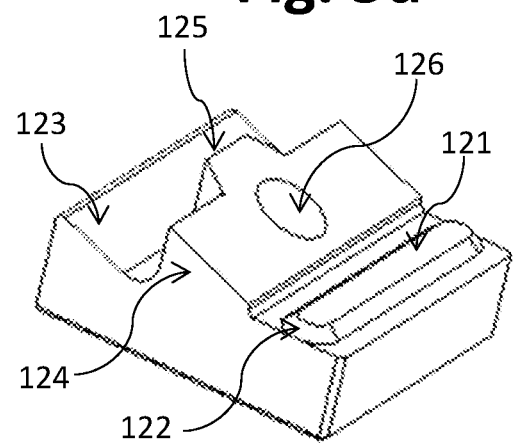
FIG. 5f is another perspective view of the lower jaw of the clamp, according to an exemplary embodiment of the present invention.
Figure 6B:
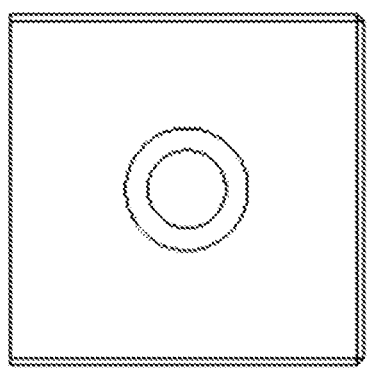
FIG. 6b is a top view of the upper jaw of the clamp, according to an exemplary embodiment of the present invention.
Figure 6A:
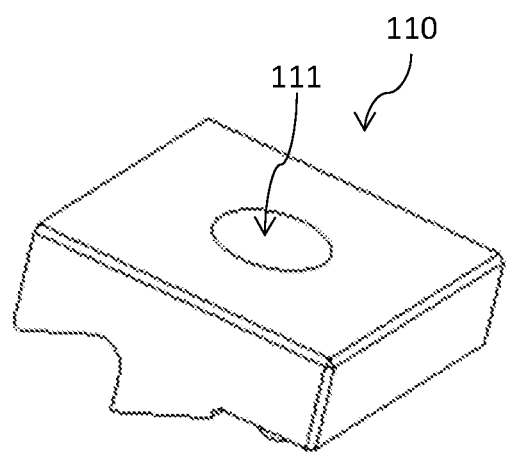
FIG. 6a is a top and side perspective view of the upper jaw of the clamp, according to an exemplary embodiment of the present invention.
Figure 6C:
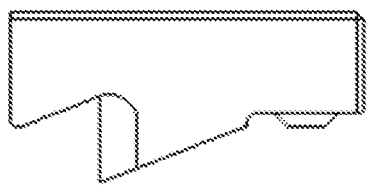
FIG. 6c is a side view of the upper jaw of the clamp, according to an exemplary embodiment of the present invention.
Figure 6D:
FIG. 6d is a front view of the upper jaw of the clamp, according to an exemplary embodiment of the present invention.
Figure 6E:
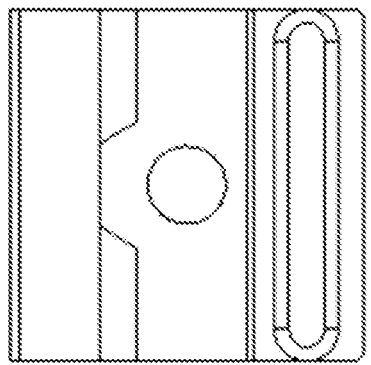
FIG. 6e is a bottom view of the upper jaw of the clamp, according to an exemplary embodiment of the present invention.
Figure 6F:
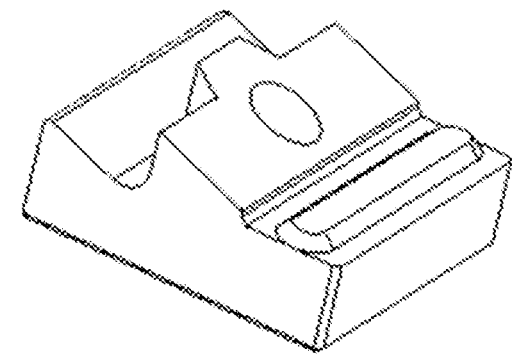
FIG. 6f is another perspective view of the upper jaw of the clamp, according to an exemplary embodiment of the present invention.
Figure 7A:
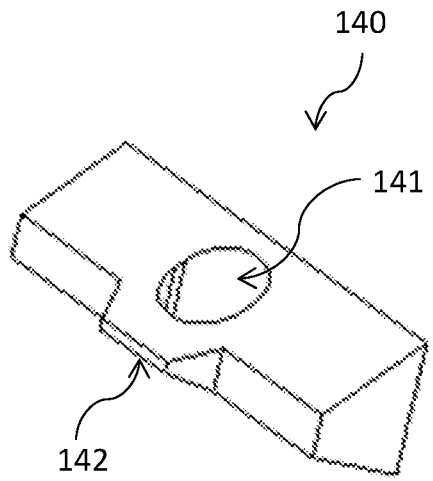
FIG. 7a is a perspective view of a wedge of the clamp, according to an exemplary embodiment of the present invention.
Figure 7B:
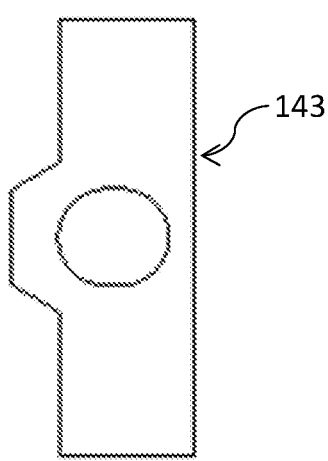
FIG. 7b is a top view of the wedge of the clamp, according to an exemplary embodiment of the present invention.
Figure 7C:
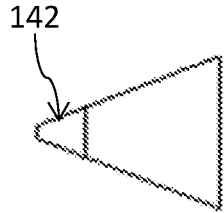
FIG. 7c is a side view of the wedge of the clamp, according to an exemplary embodiment of the present invention.
Figure 7D:
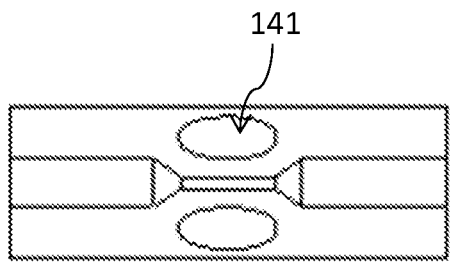
FIG. 7d is a rear view of the wedge of the clamp, according to an exemplary embodiment of the present invention.
Figure 7E:
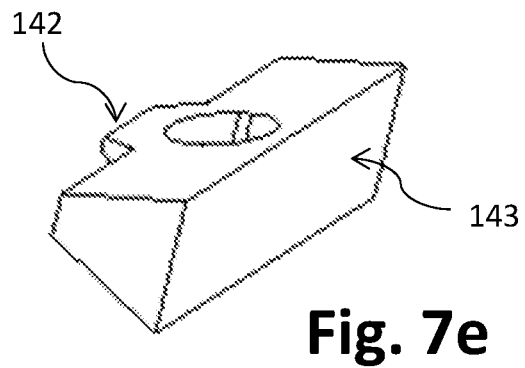
FIG. 7e is another perspective view of the wedge of the clamp, according to an exemplary embodiment of the present invention.
Figure 8A:
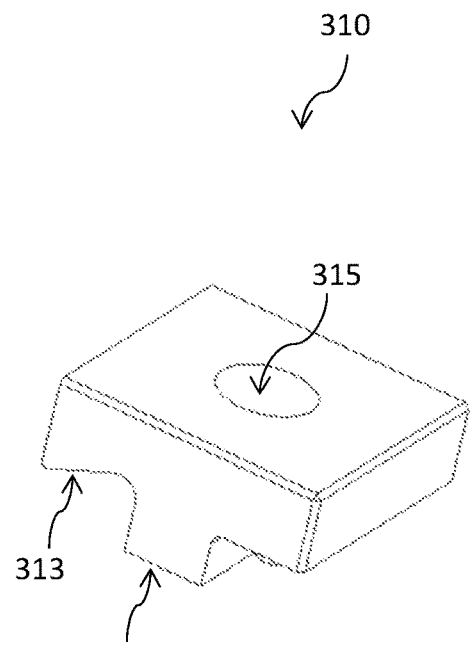
FIG. 8a is a perspective view of another implementation of an upper jaw of the clamp, according to an exemplary embodiment of the present invention.
Figure 8B:
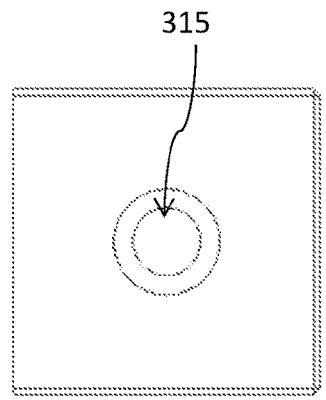
FIG. 8b is a top view of the upper jaw of the clamp, according to an exemplary embodiment of the present invention.
Figure 8C:
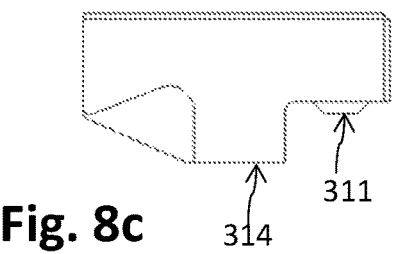
FIG. 8c is a side view of the upper jaw of the clamp, according to an exemplary embodiment of the present invention.
Figure 8D:
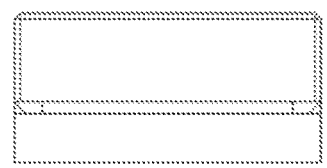
FIG. 8d is a front view of the upper jaw of the clamp, according to an exemplary embodiment of the present invention.
Figure 8E:
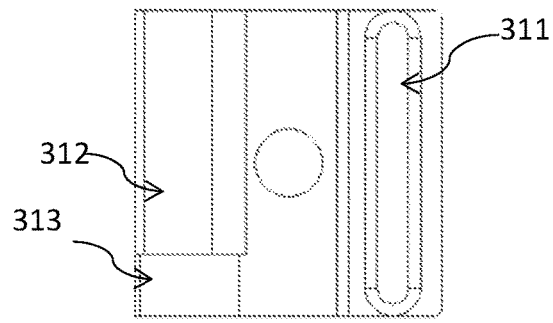
FIG. 8e is a bottom view of the upper jaw of the clamp, according to an exemplary embodiment of the present invention.
Figure 8F:
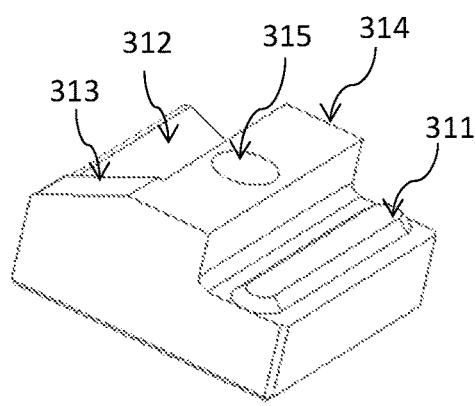
FIG. 8f is another perspective view of the upper jaw of the clamp, according to an exemplary embodiment of the present invention.

Referring to FIG. 1 shows an exemplary embodiment of the disclosed quick mounting assembly. The quick mounting assembly can include a clamp 100 and a rail 200. FIG. 2 shows an exploded view of the quick-mounting assembly. The clamp 100 includes an upper jaw 110, a lower jaw 120, a base plate 130, a wedge 140, a screw 150, and a nut 160. Referring to FIGS. 3*a* and 3*b* show an exemplary embodiment of the rail 200. The rail can be coupled to an article or an accessory. The rail can have a proximal end and a distal end. The rail can be coupled to the clamp at the proximal end thereof, while the distal end or any side of the rail near the distal end can be coupled to an article.

The rail is shown to be of a cuboid shape where the size of the rail can be varied. Moreover, the shape of the rail can be varied without departing from the scope of the present invention. For example, the shape of the rail can be adapted to the article with which the rail is coupled. The top and the bottom of the rail near the proximal end can be provided with a groove 210 that can be dimensioned to receive tooths of the clamp. The groove is shown in the drawings in continuous and extends along the length or width of the rail. However, the groove can also be provided discontinuously i.e., in intervals without departing from the scope of the present invention.

The edges 220 of the groove can optionally be chamfered edges. In an ROV, parts such as tools and manipulators can be fixed to the clamp which can then be mounted to the rail. The rail mount can be part of a robotic vehicle's framework to allow manipulators to be mounted on it.

FIGS. 4*a*-4*f* show different views of the base plate 130. The base plate can include a base 131. The base on its rear side can be mounted to a payload. For example, screw holes are shown at the corners of the base through which fasteners can be inserted for securing the base plate to a payload. The payload can be any article, object, tool, implement, or the like. Any other means of coupling the base plate, such as adhesives, welds, and the like are within the scope of the present invention. The front side of the base can be configured to interlock with the upper jaw and the lower jaw of the clamp. The base plate can have a dovetail protrusion 132 on its front face. More clearly shown in FIG. 4*c*, the dovetail protrusion is at an acute angle relative to the base 131 forming a V-shape valley. Two valleys, i.e., an upper valley and a lower valley formed by the dovetail protrusion. The dovetail protrusion can longitudinally extend along the base while a traversing channel 133 passes through the middle of the dovetail protrusion. Two cutouts 134 can also be provided in the dovetail protrusion, however, such cutouts 134 can be optional.

Referring to FIGS. 5*a*-5*f* show different views of the lower jaw 120 of the clamp 100. The lower jaw can include a tooth 121 that can be dimensioned to be received into grooves of the rail. The tooth shown in the drawings is continuous and extends along the width of the lower jaw. However, the tooth can also be provided discontinuous i.e., in intervals without departing from the scope of the present invention. The tooth edges 122 can optionally be chamfered. When the upper jaw and the lower jaw are bought closer, the tooths of the upper jaw and the lower jaw can fit into the upper groove and lower groove of the rail respectively clamping to the rail. This secures the clamp to the rail preventing accidental separation. The tooth can be elongated, or teeth spaced apart for each other can be provided. The tooth(s) and grooves, besides securing the clamp to the rail, also ensure proper alignments of the rail and clamp. The dimensions of the tooth can correspond to the dimensions of the groove and the chamfered edges of the tooth can correspond to the chamfered edges of the grooves. On the rear and top side is an end-sloped protrusion 123. This end-sloped protrusion 123 can be dimensioned to fit into the valley formed by the dovetail protrusion. When the clamp is assembled, the end-sloped protrusion 123 slides into the valley formed by the dovetail protrusion. On about the middle can be provided a mid-sloped protrusion 124. The mid-sloped protrusion 124 can have a flat and sloped surface such that to press the wedge against the rail when the upper and lower jaws are compressed. The mid-sloped protrusion 124 slopes downwards from rear to front, wherein the end-sloped protrusion 123 is on the rear of the lower jaw. A trapezoidal protrusion 125 extends from the rear of the mid-sloped protrusion 124 and slightly upwards and towards the end-sloped protrusion 123. While the end-sloped protrusion 123 slides into the lower valley of the base plate, the trapezoidal protrusion 125 can fit into channel 133 of the dovetail protrusion 132. The trapezoidal protrusion 125 can be dimensioned to fit into channel 133 of the dovetail protrusion 132. Trapezoidal protrusion 125 can restrict the sideward movement of the clamp relative to the rail. The lower jaw can further include an aperture with square cutout 126 where a nut 160 is seated and the threaded lower portion of the fastener 150 is passed through.

Referring to FIGS. 6a-6e show different views of the upper jaw 110. The upper jaw 110 can be identical to the lower jaw. The upper jaw can be a mirror image of the lower jaw. The end-sloped protrusions of the upper jaw and the lower jaw can slide into the upper valley and the lower valley of the base plate respectively, and the trapezoidal protrusions can slide into the traversing channel. The fastener 150 passing through the upper jaw and the lower jaw can secure the upper jaw and the lower jaw, wherein the upper jaw and the lower jaw are interlocked with the base plate. The fastener can be tightened using nut 160. The screw head counterbore and aperture 111 can be different from the square cutout and aperture 126 of the lower jaw because one receives the head of the fastener while the other receives the nut. In one implementation, either aperture of the upper jaw or the lower jaw can be threaded avoiding the need for a threaded nut.

The trapezoidal protrusion 125 in the upper jaw and the lower jaw and the trapezoidal protrusion 142 in the wedge engages with the traversing channel 133 in the dovetail protrusion to prevent the upper jaw, the lower jaw, the wedge, and the base plate from moving sideways from each other.

FIGS. 7a-7e show different views of wedge 140. The wedge 140 can be of an elongated triangular profile that can be compressed between the upper jaw and the lower jaw. The upper surface and the lower surface of the wedge can be sloped to juxtapose with the sloped surfaces of the mid-sloped protrusions in the upper jaw and the lower jaw. Compressing the upper jaw against the lower jaw can push the wedge outwards. An oval or cylindrical aperture 141 extends between the upper surface and the lower surface of the wedge, wherein the fastener 150 can pass through the upper jaw, the wedge, and the lower jaw. A length of aperture 141 allows some horizontal movement of the wedge i.e., the wedge can slightly move outwards and inwards, wherein the degree of movement is proportional to the length of the aperture 141. The front face of the wedge can be broad and flat while the rear face can be pointed. On the rear side of the wedge can be provided a protrusion 142 dimensioned to fit into channel 133 of the dovetail protrusion 132. The front face of the wedge can come in contact with the proximal end of the rail when the clamp is mounted to the rail. The wedge can push against the rail upon tightening the fastener 150 and bring the upper jaw and the lower jaw closer. This tightening of the wedge against the rail can further stabilize and secure the assembly.

In operation, the grooves of the rails can be positioned between the teeth of the upper jaw and the lower jaw respectively. Thereafter, the jaws can be compressed by tightening the fastener resulting in the clamping of the rail by the two jaws and pushing of the wedge against the proximal end of the rail. The wedge and the chamfered edges can provide additional strength and help in the proper alignment of the clamp relative to the rail.

When the clamp is assembled, the fastener can keep all the parts together. The fastener, although loose, can still prevent any part from falling apart, such as during storage. This makes the use of the disclosed assembly quicker and more convenient.

Referring to FIGS. 8a-8f show another embodiment of the upper jaw and the lower jaw. The upper jaw 310 has a tooth 311, an end-sloped protrusion 312, a corner-protrusion 313, a mid-flat protrusion 314, and an aperture 315. The upper jaw 310 can be similar to the upper jaw 110 of clamp 100, however, the end-sloped protrusion 312 has a corner-protrusion 313 that can fit into the cutouts 134 of the base plate to restrict the side movements. The mid-flat protrusion 314 is flat compared to sloped protrusion in the upper jaw 110. Thus, the wedge can also be avoided when using the jaw 310 with the clamp 100.

Figure 9:
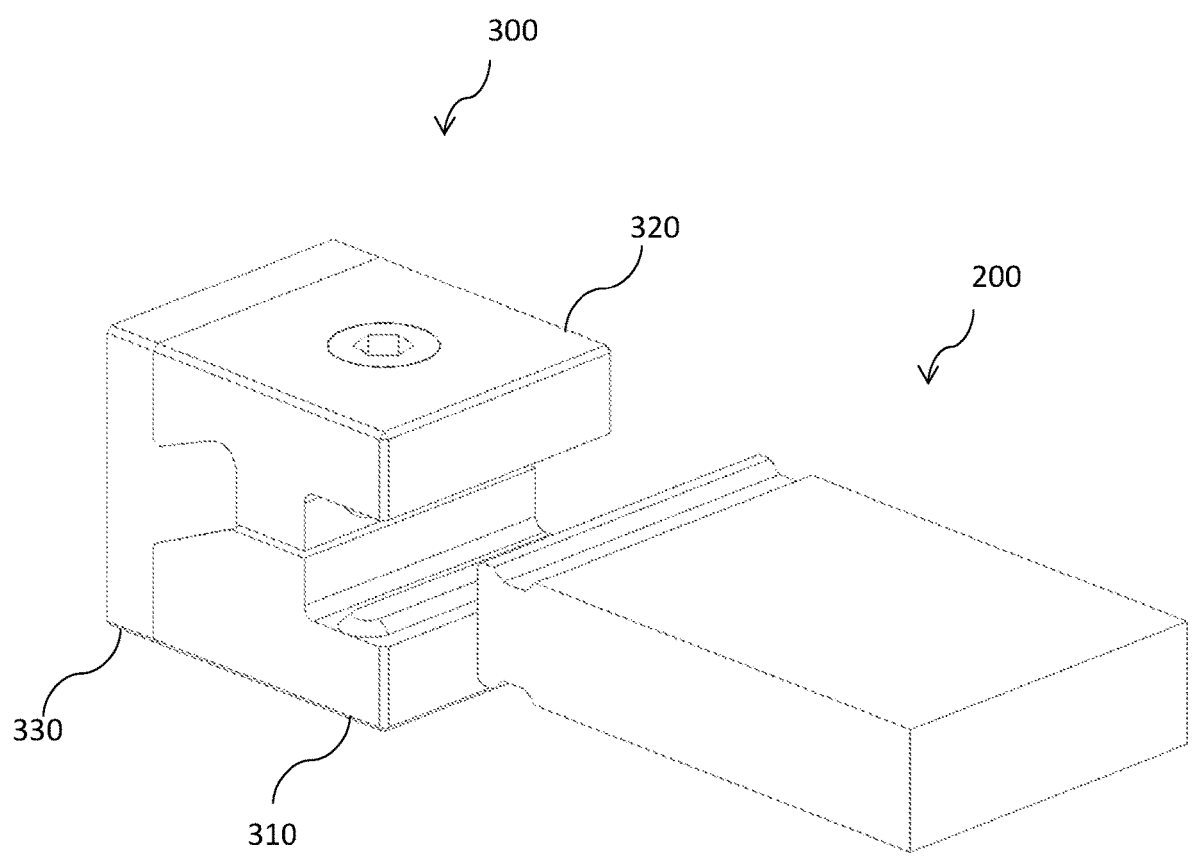
FIG. 9 is a perspective view of another implementation of the quick mounting assembly, according to an exemplary embodiment of the present invention.
Figure 10:
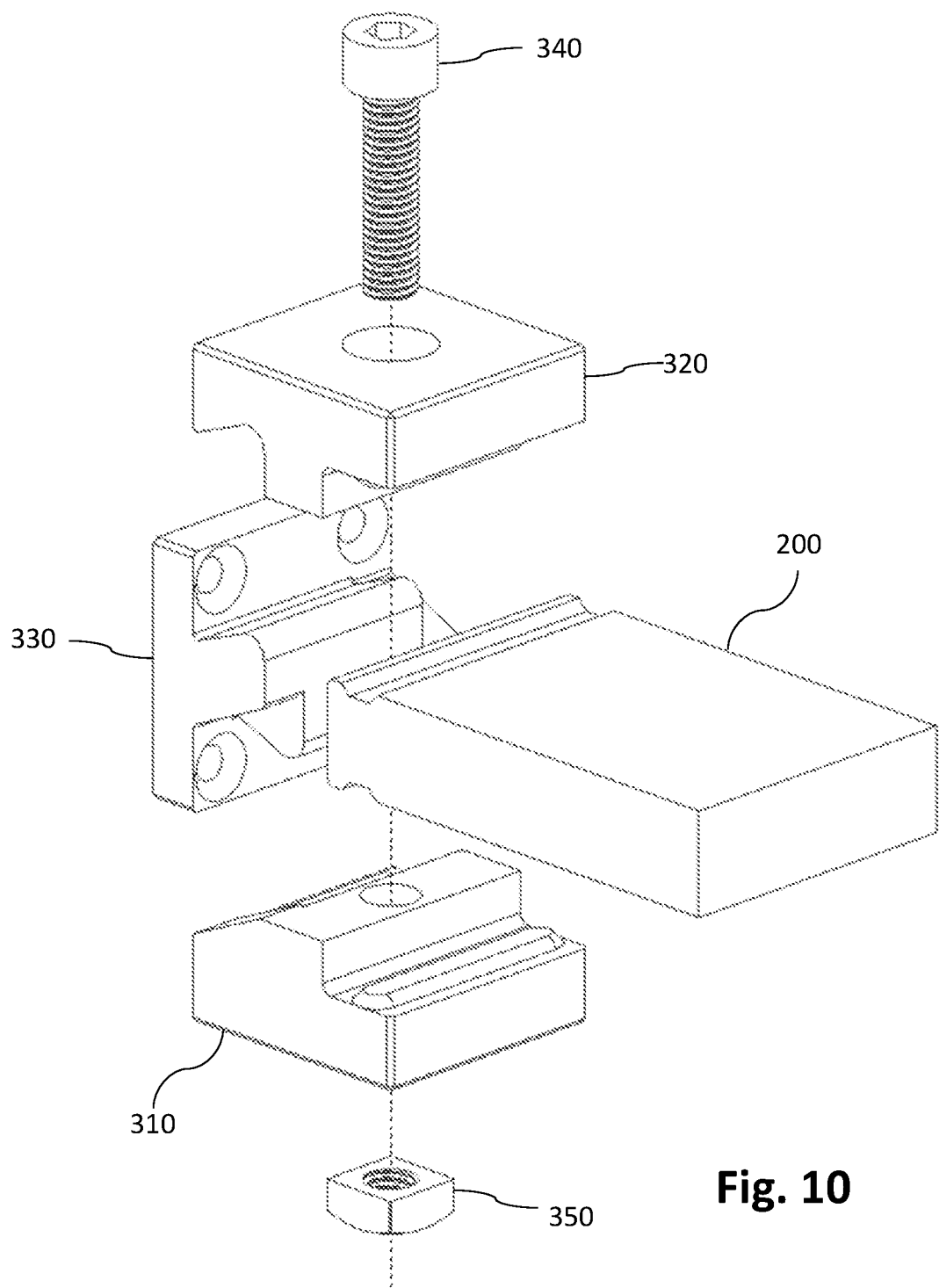
FIG. 10 is an exploded view of the quick mounting assembly shown in FIG. 9, according to an exemplary embodiment of the present invention.

Referring to FIGS. 9 and 10 show another embodiment of the quick mounting assembly. The quick mounting assembly has the clamp 300 while the rail 200 can be the same. The clamp 300 has an upper jaw 310, a lower jaw 320, and a base plate 330. A fastener 340 can couple the upper jaw and the lower jaw that is interlocked with the base plate. The clamp 300 may not have the wedge, and thus the mid-flat protrusions in the upper jaw and the lower jaw can be flat. Also, since the corner protrusion can restrict the side movement, the need for trapezoidal protrusions in the upper and lower jaws and the traversing channel in the base plate can be eliminated. The upper jaw 310 and the lower jaw 320 can clamp to the rail 200, wherein the upper jaw and the lower jaw can be interlocked with the base plate, and the assembly can be secured by tightening the fastener 340. Working can be similar to the clamp 100 and thus details are not repeated here. A convex rib 470 between the end-sloped protrusion and mid-sloped protrusion in the upper jaw and the lower jaw can also be provided for strength reinforcement. Also, the apertures in wedge 440 can be round compared to oval apertures in wedge 140, wherein the round aperture can have enough tolerance for the forward and backward movement of the wedge when the jaws are compressed.

Figure 11:
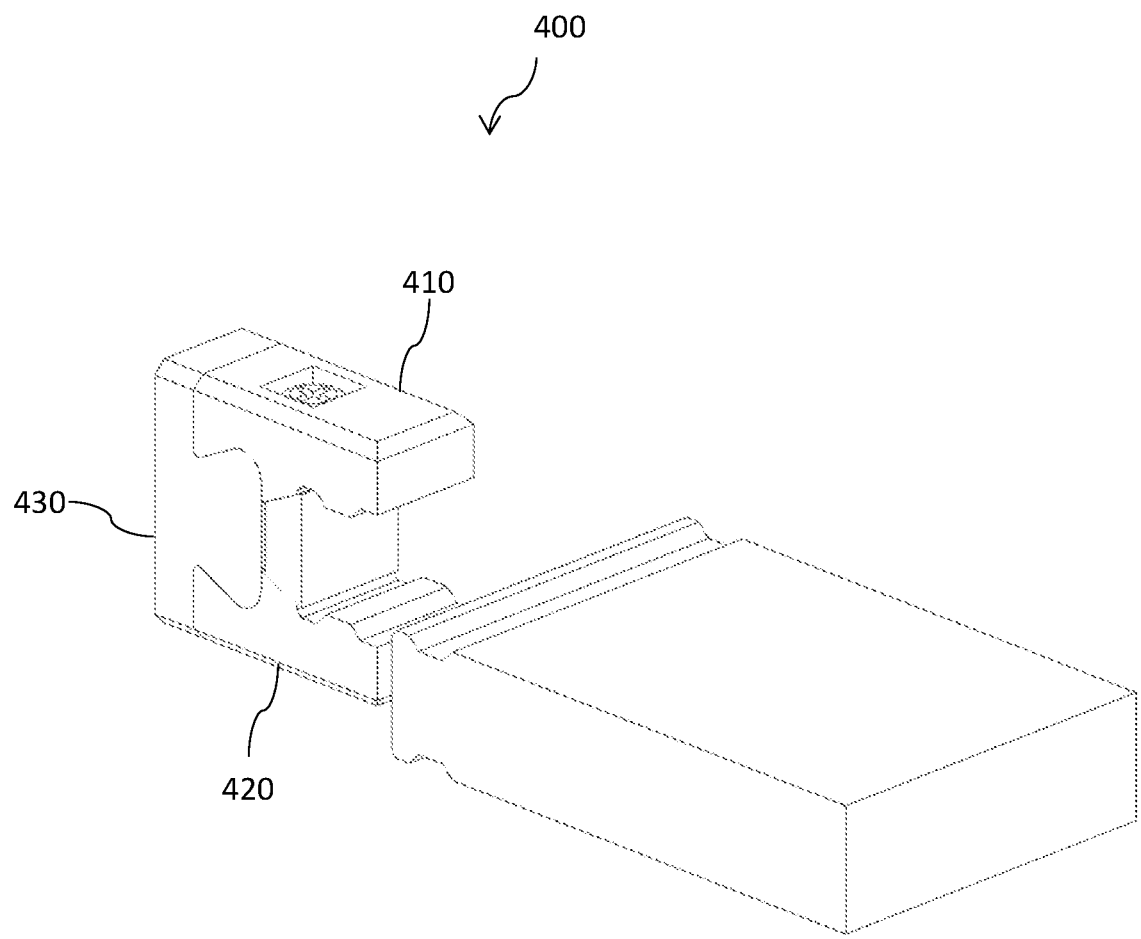
FIG. 11 is a perspective view of another implementation of the quick mounting assembly, according to an exemplary embodiment of the present invention.
Figure 12:
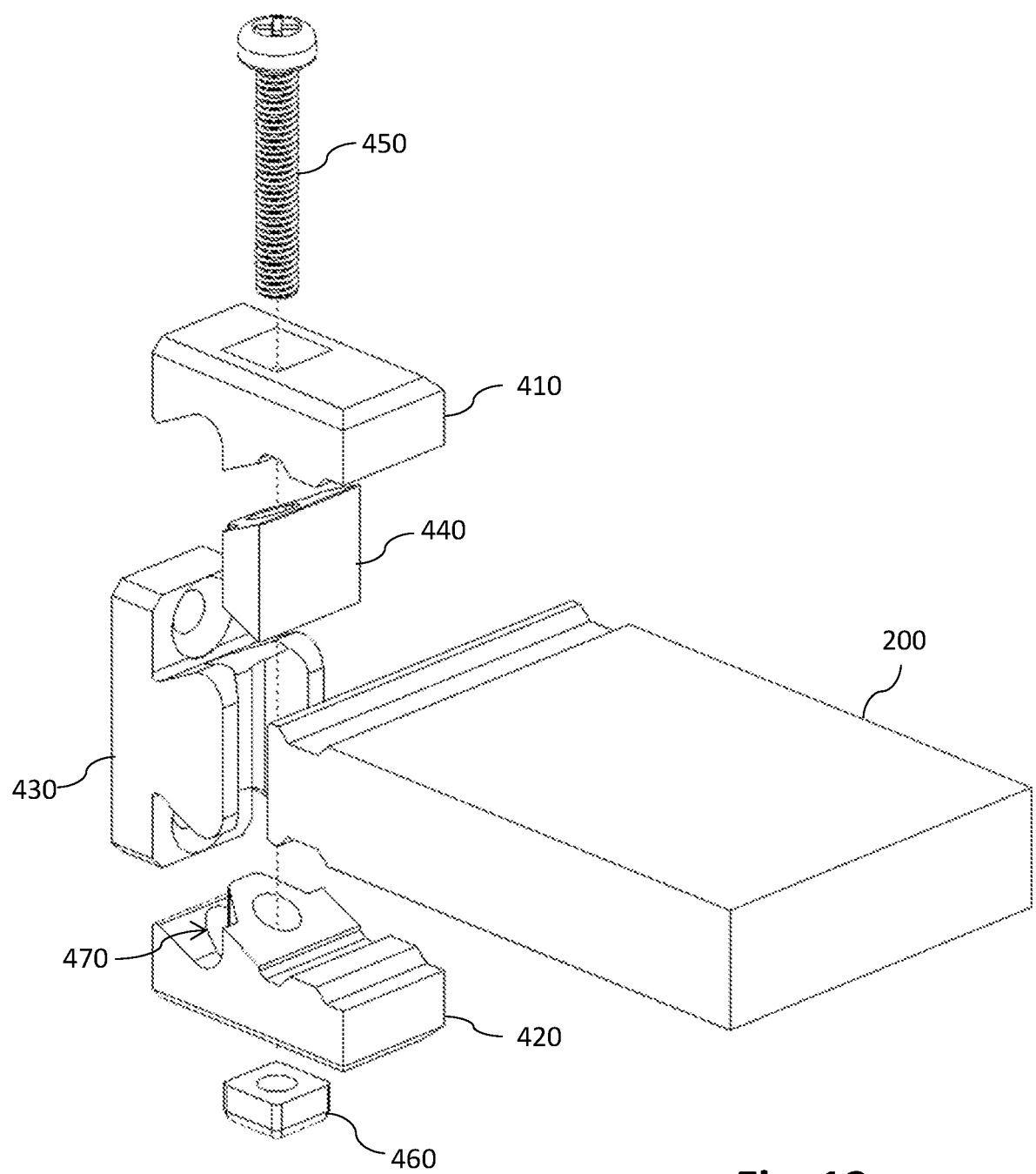
FIG. 12 is an exploded view of the quick mounting assembly shown in FIG. 11, according to an exemplary embodiment of the present invention.
Figure 13:
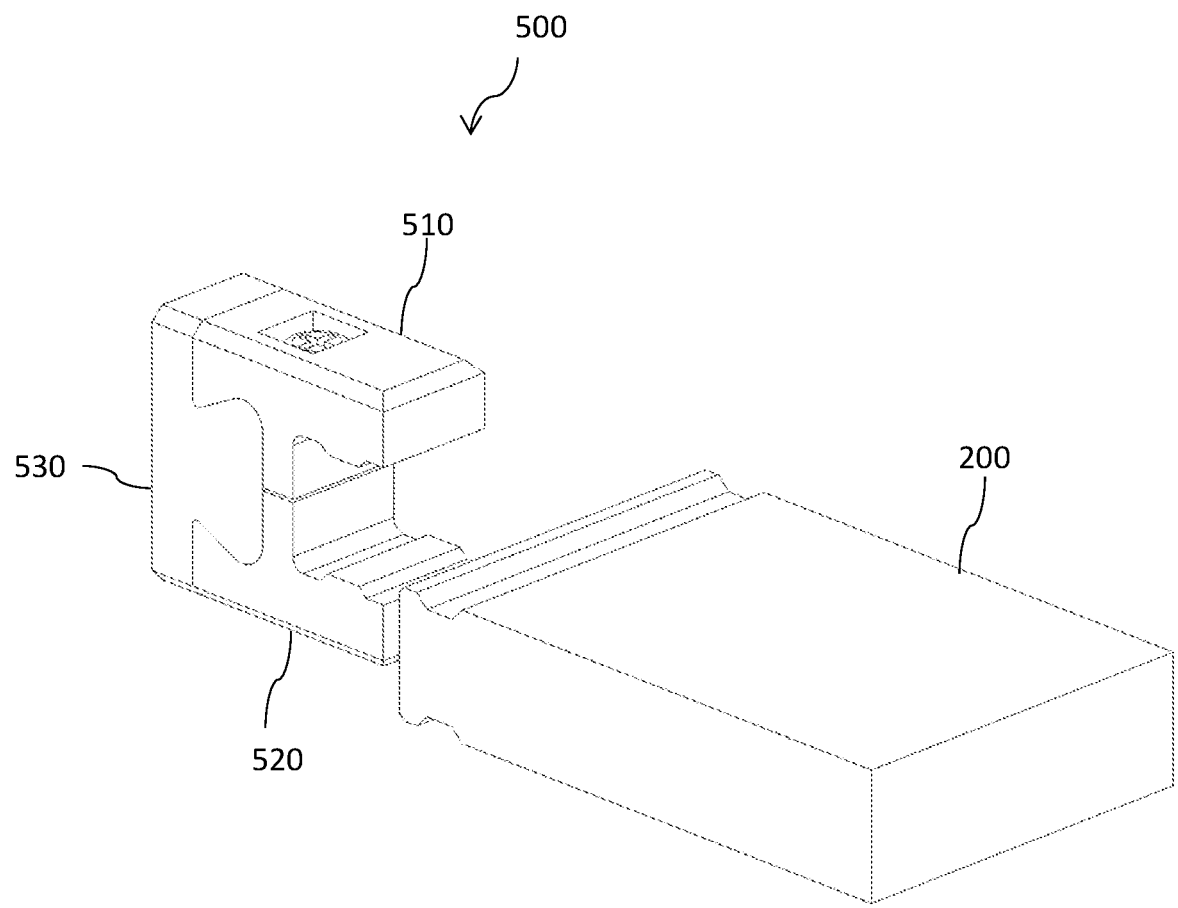
FIG. 13 is a perspective view of another implementation of the quick mounting assembly, according to an exemplary embodiment of the present invention.
Figure 14:
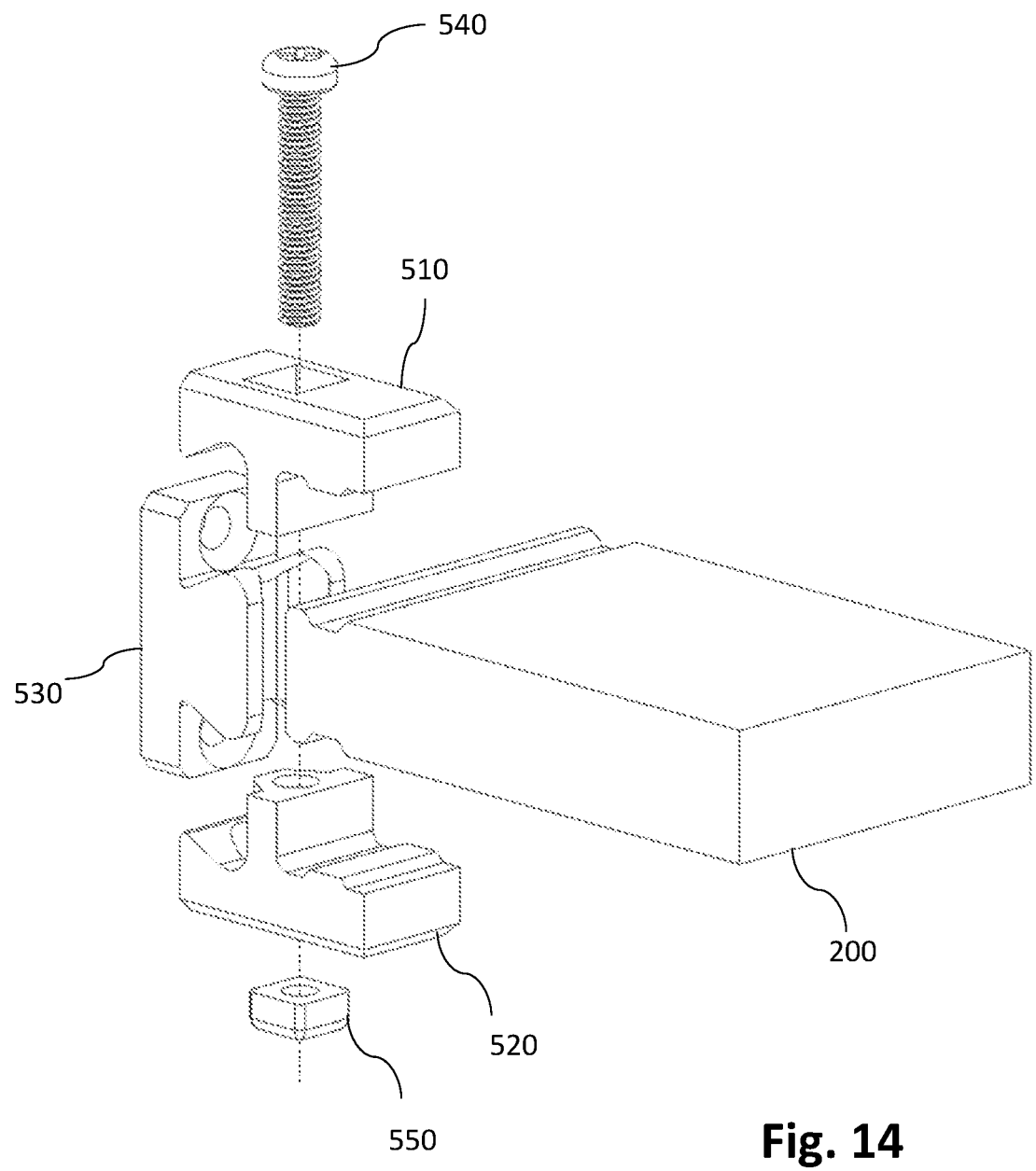
FIG. 14 is an exploded view of the quick mounting assembly shown in FIG. 11, according to an exemplary embodiment of the present invention.

Referring to FIGS. 13 and 14 which show another embodiment of clamp 400 shown in FIG. 11. The wedge may be optional, and clamp 500 does not include the wedge. Accordingly, the mid-protrusions in the upper plate 510 and the lower plate 520 can be made flat.

The disclosed quick mounting assembly can be advantageous by having higher tolerances and strength. The clamp can be clamped onto the rail by tightening a single M5 screw, allowing the whole assembly to be secured and removed in just five seconds. The screw holds all the individual pieces of the assembly together, preventing them from falling apart unless the screw is fully removed. The position of the assembly can be changed quickly and with minimum effort by loosening the screw and sliding it over the rail instead of unscrewing completely. Discrete mounting points can also be implemented on the rail for a sturdier mount. And due to the symmetry of the upper and bottom jaws, the assembly can be rotated and mounted upside down, providing more flexibility. The various parts of the assembly including the upper jaw, the lower jaw, the wedge, the rail, and the base plate is designed to be easily manufactured through 3D-printing (for e.g., the elimination of the need for support scaffolding during production by design) but also therefore possesses design features which increase ease of production through other manufacturing methods. Also, the manufacturing process can be easily scaled-up.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above-described embodiment, method, and examples, but by all embodiments and methods within the scope and spirit of the invention as claimed.

What is claimed is:

1. A quick mounting assembly comprising:
   a clamp, the clamp comprising:
   a base plate comprising:
   a base that has a front face and a rear face, the base being configured to mount to a payload; and
   a dovetail protrusion disposed on a middle of the front face of the base, the dovetail protrusion, relative to the front face of the base, forms an upper valley and a lower valley, the upper valley being formed at an acute angle, the dovetail protrusion having a traversing channel passing through a middle thereof;
   an upper jaw;
   a lower jaw, each of the upper jaw and the lower jaw having a tooth; and
   a wedge, the wedge having a protrusion on its narrow rear end configured to slidably fit into the traversing channel;
   a rail, the rail having a proximal end and a distal end, a top of the rail having an upper groove near the proximal end of the rail and extending transversely, a bottom of the rail having a lower groove near the proximal end of the rail and extends transversely; and
   a fastener;
   wherein each of the upper jaw, the lower jaw, and the wedge has concentric apertures through which the fastener can pass through for securing the upper jaw and the lower jaw to the base plate, wherein tightening of the fastener bring the upper jaw and the lower jaw closer towards each other, wherein tightening of the fastener secures the clamp to the rail;
   wherein, the tooth of the upper jaw is configured to engage with the upper groove in the rail and the tooth of the lower jaw is configured to engage with the lower groove in the rail for securing the clamp to the rail;
   wherein each of the upper jaw and the lower jaw has an end-sloped protrusion configured to slidably fit into the upper valley and the lower valley respectively for interlocking the upper jaw and the lower jaw to the base plate;
   wherein each of the upper jaw and the lower jaw have a mid-sloped protrusion, the mid-sloped protrusion has a flat and sloped surface, wherein the end-sloped protrusion and the mid-sloped protrusion face in substantially the same direction.

2. The quick mounting assembly according to claim 1, wherein the each of the upper groove and the lower groove has chamfered edges.

3. The quick mounting assembly according to claim 1, wherein the wedge is of an elongated triangular profile, the aperture in the wedge is elongated, the wedge is sandwiched between the mid-sloped protrusions of the upper jaw and the lower jaw respectively.

4. The quick mounting assembly according to claim 3, wherein the wedge has a flat front face and a narrow rear end, wherein the narrow rear end faces the base plate,
   wherein the elongated aperture in the wedge permits the wedge to move towards and away from the base plate,
   wherein bringing the upper jaw and the lower jaw closer by tightening the fastener pushes the wedge away from the base plate.

5. The quick mounting assembly according to claim 4, wherein the flat front face of the wedge is configured to juxtapose with the proximal end of the rail.

6. The quick mounting assembly according to claim 5, wherein the mid-sloped protrusions of each of the upper jaw and the lower jaw has trapezoidal protrusions, and the trapezoidal protrusions of the upper jaw and the lower jaw and the protrusion of the wedge are configured to slidably fit into the traversing channel.

7. A method for quickly mounting a payload to an object, the method comprising:
   providing a quick mounting assembly comprising:
   a clamp, the clamp comprising:
   a base plate, comprising:
   a base that has a front face and a rear face, the base being configured to mount to the payload; and
   a dovetail protrusion disposed on a middle of the front face of the base, the dovetail protrusion, relative to the front face of the base, forms an upper valley and a lower valley, the upper valley being formed at an acute angle, the dovetail protrusion having a traversing channel passing through a middle thereof;
   an upper jaw;
   a lower jaw, each of the upper jaw and the lower jaw having a tooth;
   a wedge, the wedge having a protrusion on its narrow rear end configured to slidably fit into the traversing channel;
   a rail, the rail having a proximal end and a distal end, a top of the rail having an upper groove near the proximal end of the rail and extending transversely, a bottom of the rail having a lower groove near the proximal end of the rail and extends transversely; and
   a fastener;
   wherein each of the upper jaw, the lower jaw, and the wedge has concentric apertures through which the fastener can pass through for securing the upper jaw and the lower jaw to the base plate, the wedge sandwiched between the upper jaw and the lower jaw, wherein tightening of the fastener brings the upper jaw and the lower jaw closer towards each other, wherein tightening of the fastener secures the clamp to the rail;
   wherein, the tooth of the upper jaw is configured to engage with the upper groove in the rail and the tooth of the lower jaw is configured to engage with the lower groove in the rail for securing the clamp to the rail;

positioning the rail between the upper jaw and the lower jaw; and tightening the fastener.

8. The method according to claim 7, wherein each of the upper groove and the lower groove has chamfered edges.

9. The method according to claim 7, wherein the wedge is of an elongated triangular profile, the aperture in the wedge is elongated, the wedge is sandwiched between mid-sloped protrusions of the upper jaw and the lower jaw respectively.

10. The method according to claim 9, wherein the wedge has a flat front face and a narrow rear end, wherein the narrow rear end faces the base plate, wherein the elongated aperture in the wedge permits the wedge to move towards and away from the base plate, wherein bringing the upper jaw and the lower jaw closer by tightening the fastener pushes the wedge away from the base plate.

11. The method according to claim 10, wherein the flat front face of the wedge is configured to juxtapose with the proximal end of the rail.

12. The method according to claim 11, wherein the mid-sloped protrusions of each of the upper jaw and the lower jaw has trapezoidal protrusions, and the trapezoidal protrusions of the upper jaw and the lower jaw and the protrusion of the wedge are configured to slidably fit into the traversing channel.

\* \* \* \* \*